US012740560B2

(12) United States Patent
Sierotzki

(10) Patent No.: US 12,740,560 B2
(45) Date of Patent: Sep. 22, 2026

(54) **METHODS OF CONTROLLING OR PREVENTING INFESTATION OF BANANA PLANTS BY PHYTOPATHOGENIC MICROORGANISMS OF THE GENUS *PSEUDOCERCOSPORA***

(71) Applicant: SYNGENTA CROP PROTECTION AG, Basel (CH)

(72) Inventor: Helge Sierotzki, Stein (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 834 days.

(21) Appl. No.: 17/765,540

(22) PCT Filed: Sep. 25, 2020

(86) PCT No.: PCT/EP2020/076868
§ 371 (c)(1),
(2) Date: Mar. 31, 2022

(87) PCT Pub. No.: WO2021/063818
PCT Pub. Date: Apr. 8, 2021

(65) Prior Publication Data

US 2022/0354118 A1 Nov. 10, 2022

(30) Foreign Application Priority Data

Oct. 2, 2019 (EP) .................................... 19201182

(51) Int. Cl.
*A01N 43/40* (2006.01)

(52) U.S. Cl.
CPC .................................... *A01N 43/40* (2013.01)

(58) Field of Classification Search
CPC ...................................................... A01N 43/40
See application file for complete search history.

(56) References Cited

U.S. PATENT DOCUMENTS

| | | | | |
|---|---|---|---|---|
| 8,026,195 B2 | 9/2011 | Dunkel et al. | | |
| 10,945,433 B2 | 3/2021 | Ceciliano et al. | | |
| 2009/0326016 A1 | 12/2009 | Dunkel et al. | | |
| 2014/0038950 A1* | 2/2014 | Helie | ..................... | A01N 43/54 514/269 |
| 2019/0281826 A1 | 9/2019 | Ceciliano Solis et al. | | |

FOREIGN PATENT DOCUMENTS

| | | | | |
|---|---|---|---|---|
| CA | 2 737 232 A1 | 3/2010 | | |
| CN | 101495472 A | 7/2009 | | |
| CN | 107635403 A | 1/2018 | | |
| WO | 2015/185485 A1 | 12/2015 | | |
| WO | WO-2016066644 A1 * | 5/2016 | ............. | A01N 37/18 |
| WO | 2018/116027 A1 | 6/2018 | | |
| WO | 2019122012 A1 | 6/2019 | | |

OTHER PUBLICATIONS

Arango Isaza et al., "Combating a Global Threat to a Clonal Crop: Banana Black Sigatoka Pathogen *Pseudocercospora fijiensis* (Synonym Mycosphaerella fijiensis) Genomes Reveal", Aug. 11, 2016, PLOS Genetics, 12(8), pp. 1-36. (Year: 2016).*
Pajot, "Contribution to the ecological study of Aedes (Stegomyia) simpsoni (Díptera, Culicidae). Study of larval habitats in the Central African Republic.", 1975, Cahiers Orstom, Serie Entomologie Medicale et Parasitologie, vol. 13, No. 3, pp. 135-164, Abstract record May 22, 1976. (Year: 1976).*
Churchill, "Mycosphaerella fijiensis, the black leaf streak pathogen of banana: progress towards understanding pathogen biology and detection, disease development, and the challenges of control", Molecular Plant Pathology, vol. 12, (4), pp. 307-328, May 2011.
Written Opinion of the International Searching Authority and International Search Report for International Application No. PCT/EP2020/076868 mailed Jan. 12, 2021.
Extended European Search Report for EP Application No. 19201182.3 mailed Apr. 8, 2020.

* cited by examiner

*Primary Examiner* — Michael B. Pallay
(74) *Attorney, Agent, or Firm* — BakerHostetler; Toni-Junell Herbert

(57) ABSTRACT

The present invention relates to methods for controlling or preventing infestation of a banana plant by phytopathogenic microorganisms of the genus *Pseudocercospora*, in particular *Pseudocercospora fijiensis*, comprising applying to a crop of banana plants, the locus thereof, or propagation material thereof, a compound according to formula (I) wherein R1, R2, R3, R4, R5, Y, A, B are as defined herein.

(I)

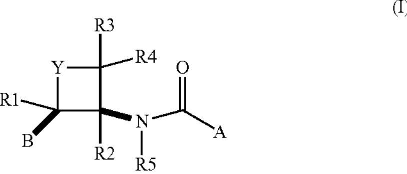

15 Claims, No Drawings

METHODS OF CONTROLLING OR PREVENTING INFESTATION OF BANANA PLANTS BY PHYTOPATHOGENIC MICROORGANISMS OF THE GENUS *PSEUDOCERCOSPORA*

CROSS-REFERENCE TO RELATED APPLICATIONS

This application is a 371 National Stage application of International Application No. PCT/EP2020/076868 filed Sep. 25, 2020, which claims the benefit of EP 19201182.3, filed Oct. 2, 2019, the entire contents of these applications are hereby incorporated by reference.

TECHNICAL FIELD

The present invention relates to methods for controlling or preventing infestation of banana plant by phytopathogenic microorganisms of the genus *Pseudocercospora.*

BACKGROUND

Globally, one of the most important diseases in banana production is Black Sigatoka disease caused by *Pseudocercospora fijiensis*. It causes serious leaf defoliation and indirect post-harvest fruit quality problems such as premature ripening of the fruit. Plants with damaged leaves by the Black Sigatoka disease may have up to 50% lower yield of fruit.

The current invention provides a further improved method for controlling or preventing infestation of banana plants by the phytopathogenic microorganisms of the genus *Pseudocercospora*, in particular *Pseudocercospora fijiensis*. Hence, the current invention provides an important means for banana farmers to control or prevent infestation by the phytopathogenic microorganisms of the genus *Pseudocercospora*, in particular *Pseudocercospora fijiensis* which causes Black Sigatoka.

DESCRIPTION OF THE EMBODIMENTS

Cyclobutylcarboxamide compounds and processes for their preparation have been disclosed in WO2013/143811 and WO2015/003951. It has now been surprisingly found that particular cyclobutylcarboxamide compounds disclosed in WO2013/143811 and/or WO2015/003951 are highly effective at controlling or preventing the infestation of banana plants by phytopathogenic microorganisms of the genus *Pseudocercospora*, in particular *Pseudocercospora fijiensis*. These highly effective compounds thus represent an important new solution for farmers to control or prevent infestation of banana plants by phytopathogenic microorganisms of the genus *Pseudocercospora*, in particular *Pseudocercospora fijiensis* and thus to address the severe banana disease Black Sigatoka.

Hence, as embodiment 1, there is provided a method of controlling or preventing infestation of banana plants by phytopathogenic microorganisms of the genus *Pseudocercospora*, in particular *Pseudocercospora fijiensis*, comprising applying to a crop of banana plants, the locus thereof, or propagation material thereof, a compound according to formula (I)

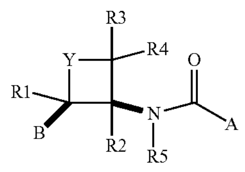

(I)

wherein

Y is O, C═O, or CR12R13;

A is a 5- or 6-membered heteroaromatic ring containing 1 to 3 heteroatoms, each independently selected from oxygen, nitrogen and sulphur, or a phenyl ring; the heteroaromatic ring or the phenyl being optionally substituted by one or more R6;

R6 is, independently of each other, halogen, cyano, C1-C4-alkyl, C1-C4-haloalkyl, C1-C4-alkoxy, C1-C4-haloalkoxy, C1-C4-haloalkylthio, C1-C4-alkoxy-C1-4-alkyl or C1-C4-haloalkoxy-C1-C4-alkyl; R1, R2, R3, R4, R12 and R13, independently of each other, are hydrogen, halogen, cyano, C1-C4-alkyl, C1-C4-alkoxy or C1-C4-haloalkyl, R5 is hydrogen, methoxy or hydroxyl, B is phenyl substituted by one or more R8, R8 is, independently of each other, halogen, cyano or a group -L-R9, where each L is independently of each other a bond, —O—, —OC(O)—, —NR7-, —NR7CO—, —NR7S(O)n-, —S(O)n-, —S(O)nNR7-, —COO— or CONR7-, n is 0, 1 or 2, R7 is hydrogen, C1-C4-alkyl, C1-C4-haloalkyl, benzyl or phenyl, where benzyl and phenyl is unsubstituted or substituted with halogen, cyano, C1-C4-alkyl or C1-C4-haloalkyl, R9 is, independently of each other, C1-C6-alkyl, which is unsubstituted or substituted by one or more R10, C3-C6-cycloalkyl, which is unsubstituted or substituted by one or more R10, C6-C14-bicycloalkyl, which is unsubstituted or substituted by one or more R10, C2-C6-alkenyl, which is unsubstituted or substituted by one or more R10, C2-C6-alkynyl, which is unsubstituted or substituted by one or more R10, phenyl, which is unsubstituted or substituted by R10, or heteroaryl, which is unsubstituted or substituted by one or more R10, R10 is, independently of each other, halogen, cyano, C1-C4-alkyl, C1-C4-haloalkyl, C1-C4-alkoxy, C1-C4-haloalkoxy, C1-C4-alkylthio, C1-C4-haloalkylthio, C3-C6-alkenyloxy, or C3-C6-alkynyloxy; or a salt or N-oxide thereof;

wherein B and A-CO—NR5 are cis to each other on the four-membered ring, or a tautomer or stereoisomer of these compounds.

More preferred methods according to embodiment 1 are given in the embodiments below.

As embodiment 2, there is provided a method according to embodiment 1 wherein

Y is O or CH2;

A is a 6-membered heteroaromatic ring containing 1 to 2 nitrogen atoms, or a phenyl ring; the heteroaromatic ring or the phenyl being optionally substituted by one or more R6; R6 is, independently of each other, halogen, cyano, C1-C4-alkyl, C1-C4-haloalkyl, or C1-C4-haloalkoxy;

R1, R2, R3, R4, and R5 are each hydrogen;

B is phenyl substituted by one or more R8;

R8 is, independently of each other, selected from halogen, cyano, C1-C4-alkyl, C1-C4-haloalkyl, C1-C4-haloalkoxy and C3-C6-cycloalkyl.

As embodiment 3, there is provided a method according to either embodiment 1 or embodiment 2 wherein A is a 6-membered heteroaromatic ring containing 1 to 2 nitrogen atoms and having 1 to 3 substituents selected from R6, or a phenyl ring having 1 or 3 substitutents selected from R6.

As embodiment 4, there is provided a method according to any one of embodiments 1 to 3 wherein B is a phenyl substituted by 1 to 3 substitutents R8.

As embodiment 5, there is provided a method according to any one of embodiments 1 to 4 wherein B is a phenyl substituted by 1 to 3 substituents, independently selected from fluoro, chloro, trifluoromethyl, cyclopropyl, difluoromethoxy and trifluoromethoxy;

A is a phenyl, pyridyl or pyrazinyl, which rings, independently of each other, are unsubstituted or substituted by 1 to 3 substituents, independently selected from chloro, bromo, fluoro, methyl, cyano, and trifluoromethyl, Y is O or CH2, and R1, R2, R3, R4 and R5 are each hydrogen.

As embodiment 6, there is provided a method according to any one of embodiments 1 to 5 wherein Y is CH2;

B is a mono or di-halogen substituted phenyl;

A is selected from phenyl, pyrazinyl and pyridyl, each of which is mono or di-substituted by substituents independently selected from halogen and C1-C4-haloalkyl;

R1, R2, R3, R4 and R5 are each hydrogen.

Compounds of formula (I) as disclosed in any one of embodiments 1 to 6 represent the cis racemate: the phenyl ring on the left hand side and the A-C(=O)—NH group on the right hand side are cis to each other on the cyclobutyl ring:

(Ia)

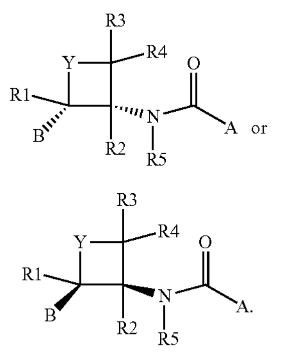

or (Ib)

Thus, the racemic compound of formula (I) is a 1:1 mixture of the compounds of formula (Ia) and (Ib). The wedged bonds shown in the compounds of formula (Ia) and (Ib) represent absolute stereochemistry, whereas the thick straight bonds such as those shown for the compounds of formula (I) represent relative stereochemistry in racemic compounds.

It has also surprisingly been found that one enantiomer of the compounds of formula (I) is particularly useful in controlling or preventing the infestation of banana plants by the phytopathogenic microorganism *Pseudocercospora fijiensis.*

Thus, as embodiment 7, there is provided the method according to any one of embodiments 1 to 6 wherein the compound is of formula (Ia)

(Ia)

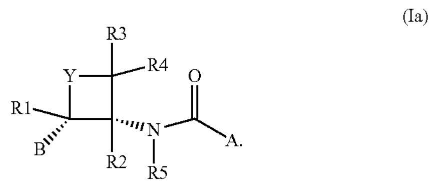

A skilled person is aware that according to the method of embodiment 2, the compound of formula (Ia) is generally applied as part of a pesticidal composition. Hence, as embodiment 8, there is provided a method of controlling or preventing infestation of banana plants by the phytopathogenic microorganism *Pseudocercospora fijiensis* comprising applying to a crop of banana plants, the locus thereof, or propagation material thereof a pesticidal composition comprising a compound according to anyone of embodiments 1-7 and one or more formulation adjuvants. As embodiment 9, there is provided a method of controlling or preventing infestation of banana plants by the phytopathogenic microorganism *Pseudocercospora fijiensis* comprising applying to a crop of banana plants, the locus thereof, or propagation material thereof a pesticidal composition comprising a compound of formula (Ia) and one or more formulation adjuvants. In a method according to embodiment 9, for pesticidal compositions comprising both a compound of formula (Ia) and a compound of formula (Ib), the ratio of the compound of formula (Ia) to its enantiomer (the compound of formula (Ib)) must be greater than 1:1. Preferably, the ratio of the compound of formula (Ia) to the compound of formula (Ib) is greater than 1.5:1, more preferably greater than 2.5:1, especially greater than 4:1, advantageously greater than 9:1, desirably greater than 20:1, in particular greater than 35:1.

Mixtures containing up to 50%, preferably up to 40%, more preferably up to 30%, especially up to 20%, advantageously up to 10%, desirably up to 5%, in particular up to 3%, of the trans stereoisomers of the compounds of formula (I) (i.e. wherein the B and the A-C(=O)—NH groups are trans to each other) are also understood to be part of this invention. Preferably, the ratio of the compound of formula (I) to its trans isomer is greater than 1.5:1, more preferably greater than 2.5:1, especially greater than 4:1, advantageously greater than 9:1, desirably greater than 20:1, in particular greater than 35:1.

Preferably, in a composition comprising the compound of formula (Ia), its trans isomer (i.e. wherein the B and the A-CO—NR2 groups are trans to each other) and the compound of formula (Ib), the composition comprises the compound of formula (Ia) in a concentration of at least 50%, more preferably 70%, even more preferably 85%, in particular over 90%, and particularly preferably over 95%, each based on the total amount of compound of formula (Ia), its trans isomer and the compound of formula (Ib).

Further, as embodiment 10, there is provided a method of controlling or preventing infestation of banana plants by the phytopathogenic microorganism *Pseudocercospora fijiensis* comprising applying to a crop of banana plants, the locus thereof, or propagation material thereof, a compound according to formula (C)

(Ic)

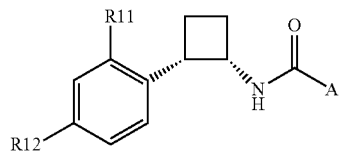

wherein

R11 and R12 are independently selected from halogen;

A is pyridyl which is substituted by one or two substituents independently selected from halogen and C1-C4-haloalkyl.

As embodiment 11, there is provided a method according to embodiment 10, wherein R11 and R12 are independently selected from chloro and fluoro;

A is pyrid-2-yl or pyrid-3-yl, which is substituted by one or two $C_1$-$C_4$-haloalkyl substituents.

As embodiment 12, there is provided a method according to embodiments 10 or 11, wherein A is selected from

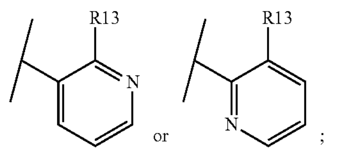

or ;

R13 is $C_1$-$C_4$-haloalkyl, preferably trifluoromethyl.

As embodiment 13, there is provided a method according to any one of embodiments 10 to 12 wherein the compound is selected from any one of compounds 1 to 12 of formula (Ic)

(Ic)

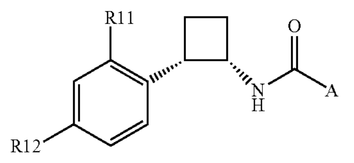

wherein R11, R12 and A are as defined in the following table:

| Compound | A | R11 | R12 |
| --- | --- | --- | --- |
| 1 | 2-trifluoromethyl-pyrid-3-yl | Cl | Cl |
| 2 | 3-trifluoromethyl-pyrid-2-yl | Cl | Cl |
| 3 | 3-trifluoromethyl-pyrid-2-yl | F | F |
| 4 | 3-trifluoromethyl-pyrid-2-yl | Cl | F |
| 5 | 3-chloro-pyrid-2-yl | Cl | Cl |
| 6 | 2-methyl-pyrid-3-yl | Cl | Cl |
| 7 | 2-trifluoromethyl-pyrid-3-yl | Cl | F |

As embodiment 14, there is provided the method according to any one of embodiments 1 to 13 comprising the steps providing a composition comprising a compound as defined in any one of embodiments 1 to 13;

applying the composition to a propagation material;

planting the propagation material.

As embodiment 15, there is provided the method according to any one of embodiments 1 to 13 comprising the steps providing a composition comprising a compound as defined in any one of embodiments 1 to 13;

applying the composition to a crop of banana plants or the locus thereof.

As embodiment 16, there is provided the use of a compound as defined in any one of embodiments 1 to 13 for controlling or preventing infestation of banana plants by phytopathogenic microorganisms of the genus *Pseudocercospora*, in particular *Pseudocercospora fijiensis*.

As embodiment 17, there is provided the use of a compound as defined in any one of embodiments 1 to 13 for controlling or preventing infestation of banana plants by phytopathogenic microorganisms of the genus *Pseudocercospora*, in particular *Pseudocercospora fijiensis*.

As embodiment 18, there is provided a method for growing banana plants comprising applying or treating banana plants or a propagation material thereof with a compound as defined in any one of claims 1 to 13.

Preferably, the methods and uses according to any one of embodiments 1 to 18 are carried out via drench application.

The preparation of the compounds as defined in the methods of any one of embodiments 1 to 13 has been disclosed in WO2013/143811 and WO2015/003951 which are incorporated herein by reference.

Definitions

The term "halogen" represents fluoro, chloro, bromo or iodo, particularly fluoro, chloro or bromo.

The term "alkyl" or "alk" as used herein either alone or as part of a larger group (such as alkoxy, alkylthio, alkoxycarbonyl and alkylcarbonyl) is a straight or branched chain and is, for example, methyl, ethyl, n-propyl, n-butyl, isopropyl, sec-butyl, isobutyl, tert-butyl, pentyl, iso-pentyl or n-hexyl. The alkyl groups are suitably $C_1$-$C_4$-alkyl groups.

"Haloalkyl" as used herein are alkyl groups as defined above which are substituted with one or more of the same or different halogen atoms and are, for example, $CF_3$, $CF_2Cl$, $CF_2H$, $CCl_2H$, $FCH_2$, $ClCH_2$, $BrCH_2$, $CH_3CHF$, $(CH_3)_2CF$, $CF_3CH_2$ or $CHF_2CH_2$.

The methods and uses according to any one of embodiments 1 to 18 are preferably for controlling or preventing infestation of the crop by the phytopathogenic microorganism *cercospora* that are resistant to other fungicides. *Cercospora* that are "resistant" to a particular fungicide refer e.g. to strains of *cercospora* fungi that are less sensitive to that fungicide compared to the expected sensitivity of the same species of *cercospora* fungi. The expected sensitivity can be measured using e.g. a strain that has not previously been exposed to the fungicide.

Application according to the methods or uses according to any one of embodiments 1 to 18 is preferably to a crop of banana plants, the locus thereof or propagation material thereof. Preferably application is to a crop of banana plants or propagation material thereof, more preferably to propagation material. Application of the compounds of the invention can be performed according to any of the usual modes of application, e.g. foliar, drench, soil, in furrow etc.

The compounds as defined in any one of embodiments 1 to 13 are preferably used for pest control at 50 to 300 g active ingredient (AI)/ha, preferably 150-300 g AI/ha.

The compounds as defined in any one of embodiments 1 to 13 are suitable for use on any peanut plant, including those that have been genetically modified to be resistant to active ingredients such as herbicides, or to produce biologically active compounds that control infestation by plant pests.

Generally, a compound as defined in any one of embodiments 1 to 13 is used in the form of a composition (e.g. formulation) containing a carrier. A compound as defined in any one of embodiments 1 to 13 and compositions thereof can be used in various forms such as aerosol dispenser, capsule suspension, cold fogging concentrate, dustable powder, emulsifiable concentrate, emulsion oil in water, emulsion water in oil, encapsulated granule, fine granule, flowable concentrate for seed treatment, gas (under pressure), gas generating product, granule, hot fogging concentrate, macrogranule, microgranule, oil dispersible powder, oil miscible flowable concentrate, oil miscible liquid, paste, plant rodlet, powder for dry seed treatment, seed coated with a pesticide, soluble concentrate, soluble powder, solution for seed treatment, suspension concentrate (flowable concentrate), ultra low volume (ulv) liquid, ultra low volume (ulv) suspension, water dispersible granules or tablets, water dispersible powder for slurry treatment, water soluble granules or tablets, water soluble powder for seed treatment and wettable powder.

A formulation typically comprises a liquid or solid carrier and optionally one or more customary formulation auxiliaries, which may be solid or liquid auxiliaries, for example unepoxidized or epoxidized vegetable oils (for example epoxidized coconut oil, rapeseed oil or soya oil), antifoams, for example silicone oil, preservatives, clays, inorganic compounds, viscosity regulators, surfactant, binders and/or tackifiers. The composition may also further comprise a fertilizer, a micronutrient donor or other preparations which influence the growth of banana plants as well as comprising a combination containing the compound of the invention with one or more other biologically active agents, such as bactericides, fungicides, nematicides, plant activators, acaricides, and insecticides.

The compositions are prepared in a manner known per se, in the absence of auxiliaries for example by grinding, screening and/or compressing a solid compound of the present invention and in the presence of at least one auxiliary for example by intimately mixing and/or grinding the compound of the present invention with the auxiliary (auxiliaries). In the case of solid compounds of the invention, the grinding/milling of the compounds is to ensure specific particle size.

Examples of compositions for use in agriculture are emulsifiable concentrates, suspension concentrates, microemulsions, oil dispersibles, directly sprayable or dilutable solutions, spreadable pastes, dilute emulsions, soluble powders, dispersible powders, wettable powders, dusts, granules or encapsulations in polymeric substances, which comprise—at least—a compound as defined in any one embodiments 1 to 13 and the type of composition is to be selected to suit the intended aims and the prevailing circumstances.

As a rule, the compositions comprise 0.1 to 99%, especially 0.1 to 95%, of compound as defined in any one of embodiments 1 to 13 and 1 to 99.9%, especially 5 to 99.9%, of at least one solid or liquid carrier, it being possible as a rule for 0 to 25%, especially 0.1 to 20%, of the composition to be surfactants (% in each case meaning percent by weight). Whereas concentrated compositions tend to be preferred for commercial goods, the end consumer as a rule uses dilute compositions which have substantially lower concentrations of active ingredient.

Examples of foliar formulation types for pre-mix compositions are:

GR: Granules

WP: wettable powders

WG: water dispersable granules (powders)

SG: water soluble granules

SL: soluble concentrates

EC: emulsifiable concentrate

EW emulsions, oil in water

ME: micro-emulsion

SC: aqueous suspension concentrate

CS: aqueous capsule suspension

OD: oil-based suspension concentrate, and

SE: aqueous suspo-emulsion.

Whereas, examples of seed treatment formulation types for pre-mix compositions are:

WS: wettable powders for seed treatment slurry

LS: solution for seed treatment

ES: emulsions for seed treatment

FS: suspension concentrate for seed treatment

WG: water dispersible granules, and

CS: aqueous capsule suspension.

Examples of formulation types suitable for tank-mix compositions are solutions, dilute emulsions, suspensions, or a mixture thereof, and dusts.

As with the nature of the formulations, the methods of application, such as foliar, drench, spraying, atomizing, dusting, scattering, coating or pouring, are chosen in accordance with the intended objectives and the prevailing circumstances.

The tank-mix compositions are generally prepared by diluting with a solvent (for example, water) the one or more pre-mix compositions containing different pesticides, and optionally further auxiliaries.

Suitable carriers and adjuvants can be solid or liquid and are the substances ordinarily employed in formulation technology, e.g. natural or regenerated mineral substances, solvents, dispersants, wetting agents, tackifiers, thickeners, binders or fertilizers.

Generally, a tank-mix formulation for foliar or soil application comprises 0.1 to 20%, especially 0.1 to 15%, of the desired ingredients, and 99.9 to 80%, especially 99.9 to 85%, of a solid or liquid auxiliaries (including, for example, a solvent such as water), where the auxiliaries can be a surfactant in an amount of 0 to 20%, especially 0.1 to 15%, based on the tank-mix formulation.

Typically, a pre-mix formulation for foliar application comprises 0.1 to 99.9%, especially 1 to 95%, of the desired ingredients, and 99.9 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Normally, a tank-mix formulation for seed treatment application comprises 0.25 to 80%, especially 1 to 75%, of the desired ingredients, and 99.75 to 20%, especially 99 to 25%, of a solid or liquid auxiliaries (including, for example, a solvent such as water), where the auxiliaries can be a surfactant in an amount of 0 to 40%, especially 0.5 to 30%, based on the tank-mix formulation.

Typically, a pre-mix formulation for seed treatment application comprises 0.5 to 99.9%, especially 1 to 95%, of the desired ingredients, and 99.5 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Whereas commercial products will preferably be formulated as concentrates (e.g., pre-mix composition (formulation)), the end user will normally employ dilute formulations (e.g., tank mix composition).

Preferred seed treatment pre-mix formulations are aqueous suspension concentrates. The formulation can be applied to the seeds using conventional treating techniques and machines, such as fluidized bed techniques, the roller mill method, rotostatic seed treaters, and drum coaters. Other methods, such as spouted beds may also be useful. The seeds may be presized before coating. After coating, the seeds are typically dried and then transferred to a sizing machine for sizing. Such procedures are known in the art. The compounds of the present invention are particularly suited for use in soil and seed treatment applications.

In general, the pre-mix compositions of the invention contain 0.5 to 99.9 especially 1 to 95, advantageously 1 to 50, % by mass of the desired ingredients, and 99.5 to 0.1, especially 99 to 5, % by mass of a solid or liquid adjuvant (including, for example, a solvent such as water), where the auxiliaries (or adjuvant) can be a surfactant in an amount of 0 to 50, especially 0.5 to 40, % by mass based on the mass of the pre-mix formulation.

The invention will now be illustrated by the following non-limiting Examples. All citations are incorporated by reference.

BIOLOGICAL EXAMPLES

Effect of Different Drench Treatments of Banana Plants Against Black Sigatoka Caused by the Fungus *Pseudocercospora fijiensis*

A banana greenhouse trial was carried out in Wageningen, The Netherlands, to evaluate the efficacy of different compounds against Black Sigatoka in banana. Tissue culture plantlets of banana were transferred upon arrival to small pots (5*5 cm) containing standard soil and maintained for two weeks at 28±2° C. and ~100% relative humidity (RH) to acclimatize. Thereafter the relative humidity was reduced to around 90%. A strain from *Pseudocercospora fijiensis* was taken and cultivated on PDA media. After 3 weeks, mycelium colonies were fragmented and fragments were plated on PDA and grown approximately 4-6 weeks. Afterwards pieces of mycelium colonies from a *P. fijiensis* strain was blended in distilled water. The mycelial fragments were filtered over miracloth and the suspensions were diluted to a final concentration of approximately $5*10^5$ mycelial fragments/mi. The solutions were incubated overnight at 27° C. to recover from blending. The next day the inoculum mixtures were "atomized" using a plant spray on individual "Cavendish" banana plants, variety Grand Naine, at both sides of the last well unrolled leaf until run-off. The leaves were captured in a plastic bag for 3 days to ensure maximum humidity. Thereafter the bags were removed and the plants were maintained in the greenhouse.

Compounds are applied at a final concentration of 200 g AI/ha (calculated for a plant density of 1500 plants per ha), respectively. Application was by drenching 200 ml of water per plant. Plants were put into small trays to ensure that the compounds applied were not transferred between plants. Plants were allowed to grow symptoms for 12 weeks after the last inoculation. Disease severity was visually assessed based on being dried or alive, Black Sigatoka spots and their size. This was converted to a number which had a minimum of 1 (no infection observed) and a maximum of 9 (dried, highly infected, large spots).

Treatment List:

| | Treatment | AI Rate (g AI/ha) | Application method | Inoculation |
|---|---|---|---|---|
| 1 | CONTROL | — | — | — |
| 2 | CONTROL INFECTED | — | — | 50'000 spores/ml |
| 3 | Compound 1 (SC 450) | 200 | Drench | 50'000 spores/ml |

Assessments:

TABLE 1

| Scores per leaf based on the scoring system 1 (no infection) to 9 (highly infected) | | | | | | | | | | | | | |
|---|---|---|---|---|---|---|---|---|---|---|---|---|---|
| | | Replicates | | | | | | | | | | | Standard |
| | | 1 | 2 | 3 | 4 | 5 | 6 | 7 | 8 | 9 | 10 | Average | deviation |
| CONTROL | | 1 | 1 | 1 | 1 | 1 | 1 | 1 | 1 | 1 | 1 | 1.0 | 0 |
| CONTROL INFECTED | 12 weeks | 4 | 4 | 4 | 5 | 5 | 5 | 4 | 8 | 5 | 6 | 5.0 | 1.18 |
| Compound 1 | 12 weeks | 3 | 2 | 2 | 4 | 2 | 2 | 1 | 2 | 3 | 2 | 2.3 | 0.78 |

CONCLUSION

The results shown that application of Compound 1 by drenching significantly inhibits the severity of Black Sigatoka development and might be a promising alternative to combat Black Sigatoka in banana plants.

The invention claimed is:

1. A method of controlling or preventing infestation of a banana plant by phytopathogenic microorganism *Pseudocercospora fijiensis*, comprising applying to a crop of the banana plant, a locus thereof, or a propagation material thereof, a composition comprising an effective amount of a cis-configured compound according to formula (Ic)

(Ic)

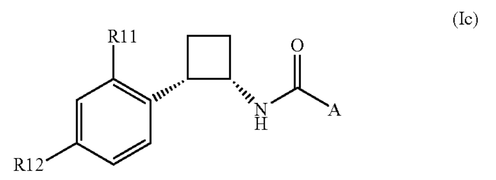

and an enantiomer of the compound according to formula (Ic), wherein

R11 and R12 are Cl;

A is 2-trifluoromethyl-pyrid-3-yl; and wherein the ratio of the compound of formula (Ic) to its corresponding cis-enantiomer is greater than 4:1.

2. The method according to claim 1, wherein the applying comprises drench application.

3. The method according to claim 1, further comprising identifying the banana plant as under disease pressure from *Pseudocercospora fijiensis*.

4. The method according to claim 1, wherein the crop of banana plants has a density of about 1500 plants per hectare.

5. The method according to claim 1, wherein the composition is applied at a rate of about 200 grams of the active ingredient per hectare.

6. The method according to claim 5, wherein the composition is concentrated to about 200 ml of water per plant.

7. The method according to claim 1, wherein the banana plant is a seedling.

8. The method according to claim 1, further comprising monitoring the banana plant for development of *Pseudocercospora fijiensis*.

9. The method according to claim 1, wherein the composition reduces infection from *Pseudocercospora fijiensis* by about 2.3±0.78 over 5±1.18.

10. The method according to claim 1, wherein the applying is to the crop of banana plants.

11. The method according to claim 1, wherein the applying is to the locus thereof.

12. The method according to claim 1, wherein the applying is to the propagation material thereof.

13. The method according to claim 1, wherein the composition is applied at a rate of about 50 to 300 grams of the active ingredient per hectare.

14. The method according to claim 1, wherein the composition is applied at a rate of about 150 to 300 grams of the active ingredient per hectare.

15. The method according to claim 1, wherein the compound according to formula (Ic) in the composition is a solid.

* * * * *